Patented Apr. 8, 1952

2,591,904

UNITED STATES PATENT OFFICE 2,591,904

COATING COMPOSITIONS AND PREPARATION THEREOF

John C. Zola, Arcadia, Calif.

No Drawing. Application October 29, 1947, Serial No. 782,961

25 Claims. (Cl. 106—170)

1

This invention relates to coating compositions and methods of preparing such compositions. More particularly, the invention is concerned with compositions in which the coating material is dispersed in a liquid medium that is relatively immiscible, as hereinafter explained, with the coating composition. This application is a continuation-in-part of my abandoned application Serial Number 750,629, filed May 26, 1947.

It is well recognized that there are definite limitations in the application of conventional coating agents to various types of surfaces. For example, ordinary lacquers, paints and enamels have to be thinned or adjusted to a proper spreadable viscosity, and to produce a satisfactory surface, a single coating of such a lacquer, paint or enamel, even applied on a well prepared non-porous surface, has to be of limited thickness. If too heavy a coat is applied, the material is apt to sag, run, wrinkle, alligator, or even blister.

Conventional lacquers, paints and enamels also have definite limitations in other respects. Such materials when applied in the usual manner produce only surfaces that are relatively smooth and of uniform texture. If a particular texture such as a stipple finish is needed, this involves a separate operation, usually by application of a sponge, roller or other implement on the coated surface right after the coating has been applied.

Also, there have been definite limitations in the composition of coating materials that could be used, in control of the porosity of the applied coating film, and in the color effects obtainable by a single application of the coating material. Attempts have been made to apply two different colored coating materials to a surface at the same time, but where this has been done the differently colored coating materials have had to be handled separately and sprayed or applied with special equipment. Even so, the finished coating shows evidence of the blending of the different colors, and such processes have been complicated and difficult to carry out.

Many efforts have been made to produce coating materials that could be applied to porous or damp surfaces, and for this purpose emulsions of lacquers in water have been tried. Such efforts have been concerned with the preparation of stable emulsions which usually include an emulsifying agent along with a stabilizing material of some sort. In order to achieve a stable emulsion however, it has been essential to form the material composing the dispersed phase in particles as small as possible in size; usually all of the particles being less than two microns in diameter, in other words small enough to be affected by the Brownian movement. Various

2 means have been tried for producing such small particles of dispersed material. Mechanical equipment, such as colloid mills, homogenizers, viscolizers and the like, have been used to produce such a small subdivision of the dispersed phase. It has also been proposed to make both phases of the emulsion quite viscous in order to improve the stability of the emulsion and various stabilizing agents have been added to the aqueous or dispersing medium for this purpose. Also, along with the emulsifying agents, various other chemicals have been added to one phase or the other in an effort to reduce surface tension and thus assist or make possible the production of finely divided dispersed particles.

Such emulsions, however, have not been particularly satisfactory for general use, and have not solved many of the problems or limitations inherent in the use of more conventional lacquers, paints and enamels.

One object of my invention is to overcome or greatly reduce these and other limitations of coating materials by utilizing entirely new and distinct methods of preparing and applying such coating materials.

A further object of my invention is to provide coating compositions which can be applied in a single coat to porous as well as non-porous surfaces, and damp as well as dry surfaces, to form adherent, hard, sound, non-peeling films of the coating material of a thickness, texture, covering ability and porosity, each of which can be varied at will within unusually large limits.

A still further and important object of my invention is to provide coating compositions which contain discrete particles or globules of two or more coating materials of different colors or shades and which can be applied to various types of surfaces to produce by a single application of the composition unique finishes and effects, such as multi-color finishes in which the different colors or shades of the particles remain distinguishable after the coating film has hardened.

Another object of my invention is the production of a dispersion of a complete coating material such as a paint, lacquer, varnish or enamel in the form of relatively large particles or globules of controlled size in an aqueous medium, the majority of the dispersed particles being larger than about 50 microns in size and in some cases being large enough to appear both in the dispersion and after application as discrete particles visible to the naked eye.

Another object of my invention is the provision of a single composition containing discrete dispersed coating material particles of the same or different colors or shades which can be applied in a single coating operation in a conventional manner to produce coatings of uniform appearance on smooth, rough and even dissimilar surfaces.

These and many other objects and advantages of my invention will be explained and will be apparent to those skilled in the art from the following description.

I have found that many new and unexpected results and effects can be obtained by a single application of a coating composition consisting essentially of a dispersion of relatively large particles of one or more coating materials in an aqueous dispersing medium. The coating material is preferably a complete coating material in itself, such as conventional or specially prepared lacquer, enamel, paint, varnish or the like. The aqueous dispersing medium preferably is not particularly viscous in character but contains just a sufficient amount of a stabilizing agent to maintain the dispersed particles of coating material as discrete particles without appreciable coalescence. By "relatively large particles" of dispersed coating material, I mean particles, the majority of which are at least 50 microns in size, it being recognized that all of the particles will not necessarily be of the same size but may range from a few particles less than 50 microns in size up to some particles which may even exceed 2500 microns in size. In other words, the dominant sizes of dispersed particles, or those sizes occurring most frequently in the dispersions, should be larger than 50 microns, and to obtain special texture and multi-color effects, a substantial portion of the dispersed particles should be larger than 100 microns in size.

My dispersions are not necessarily uniform suspensions unless the specific gravities of the dispersed and dispersing phases are substantially the same. In fact, upon standing for any length of time separate layers of the aqueous dispersing medium and the dispersed particles of coating material may be formed. The dispersions are satisfactory if the dispersed particles do not coalesce upon standing, and reform a uniform suspension upon mild shaking or stirring.

An important feature of my invention is the preparation of such dispersions with two or more different or differently colored coating materials suspended in the same aqueous medium. In these multiple dispersions it is even more important to use a stabilizer, or proportion of stabilizer, capable of preventing coalescence or substantial blending of the dispersed particles. Thus, such dispersions may contain differently colored enamels, lacquers, paints, or even combinations of these different coating materials of either the same or different colors.

These dispersions, either single or multiple, I have found can be applied by a single coating operation, preferably using a conventional spray gun (although they may be applied also by brushing, dipping or the like) to produce coating layers of unique textures, character and appearance. For example, such a multi-color dispersion of differently colored coating materials can be applied with conventional spraying equipment to produce in a single operation a hardened coating film containing the differently colored particles in discrete form with the different colors readily visible under a low power magnifying glass or to the naked eye.

Many new and desirable effects and results can be obtained with dispersions prepared according to my invention. It is possible to produce dispersed or suspended particles of coating material in various spherical, tear-drop, filament and other odd shapes, which particles retain their shape upon application and thus provide a finished coating on a surface of any one of numerous textures and appearances. Not only can coated surfaces be produced by a single operation which have a speckled or multi-colored appearance, but also special textures in a single or mixed color such as stippled or hammered finishes can be obtained simply by spraying a properly adjusted dispersion on the surface to be coated. In addition, coating layers of varying degrees of porosity can be produced, such coating ranging from films that have only microscopic porosity to films that are actually scattered sufficiently to allow the background or undercoat to show through. Such coatings of controlled porosity are particularly suitable for application to surfaces of fabrics, leather, paper, straw hats and acoustical materials used on ceilings or walls.

My invention also makes possible the application in a single treatment of much thicker coatings than have been considered possible heretofore with the attendant greater covering power and other advantages of such thicker coatings. For example, a single spray application of an ordinary lacquer produces at best a film about 2 mils in thickness. For thicker films additional coats have to be applied. In accordance with my invention, lacquer films having a thickness of 5 mils can readily be produced in one application. Also, it is even possible in accordance with my invention to form mixed coating films, i. e. in a single operation produce a heterogeneous coating film made up of a mixture of different coating materials that are not ordinarily compatible with each other.

Many other advantages are possible with the coating compositions prepared according to my invention, including the possibility of controlling gloss without the necessity of using the usual flattening agents; the application of non-bleeding coating films to surfaces (such as asphalt surfaces) which would ordinarily be attacked by solvents in the coating material; non-penetrating films applied to porous surfaces; the ability to spray a high solids content of high molecular weight materials such as styrene polymers having a molecular weight as high as 50,000 without cobwebbing; the application of coatings to adjacent surfaces of dissimilar materials without having the dissimilar surfaces appear through the finished coating; application of coating materials to damp surfaces; concealing surface defects; easier matching of colors and many others.

Heavier coatings prepared and applied according to my invention are particularly adaptable for use on rough and porous surfaces. Such materials can be applied to surfaces of rough wallboard, felt or the like, with less tendency for the lint, hair or fibers on the surfaces coated to show through or stand up after the coating has hardened. The coating material in this case has a greater tendency to bridge over rough surfaces and produce a smoother finish, or at least the appearance of a smoother finish, rather than accentuating the roughness of the surface being coated. Also, these coating materials and particularly a composition adjusted to give a fairly heavy multi-color coating can be applied to surfaces arranged side by side which have different absorbent properties without making the differences in the two surfaces readily apparent to the eye after the coating has been applied. Examples of such surfaces are plaster board or wallboard having paper tapes placed over the junction of the sheets to conceal the cracks, and also rough wooden articles where the end of one board, for example, may be adjacent a smooth planed surface of another board.

Coating materials

As previously mentioned, various coating materials, such as conventional or specially prepared clear or colored lacquers, enamels, paints, varnish and the like, can be dispersed as the particles or globules of dispersed coating material in the aqueous dispersing medium. Preferably, such coating materials include all of the necessary constituents of a coating material, such as a bodying agent, coloring matter and one or more organic solvents, the addition of other agents such as driers, hardening agents, plasticizing agents and others being included if necessary or desired. In general, it is desirable to use coating materials which do not contain too high a proportion of water soluble solids, and which do not contain too high a proportion of water-miscible solvents. In other words, the coating material as a whole should be relatively immiscible with the aqueous medium in which it is dispersed. A certain amount of the coating material may, however, be soluble in the dispersing medium without destroying the dispersion or its desirable properties as a coating composition. For example, in some cases lacquers may be dispersed in an aqueous medium even though as much as 25% of the lacquer solvents are soluble in water.

However, the presence of water soluble solvents or other substances in the coating material tends to reduce the size of the globules or particles of the dispersed phase after the dispersion is formed. If a fairly high percentage of the coating material is water soluble, such soluble matter may not dissolve at once when the dispersion is formed but may leach out of the dispersed globules of coating material over a period of a few days. Consequently, if the coating material contains a fairly high proportion of such soluble matter, allowance should be made at the time of forming the dispersion for a reduction in size of the dispersed particles of the coating material upon standing.

Some examples of coating materials which can be used in preparing coating compositions according to my invention are nitrocellulose, cellulose acetate and ethyl cellulose lacquers, various synthetic and natural resin enamels, oil base paints made with linseed or other drying oils, solutions of polymerized synthetic resins, such as the polyvinyls, polystyrenes, polyacrylic resins, urea-formaldehyde resins, water-in-oil type emulsions of lacquers, enamels, paints and the like, etc.

I have found that coating materials can be used to advantage in my compositions which are of much higher viscosity or body than could be used if the coating materials were to be applied directly in a conventional manner. The reason for this is that the aqueous dispersing medium acts as a thinner and its viscosity determines to a large extent the viscosity of my compositions when they are applied. The coating materials themselves are broken up into particles or globules suspended in this thinner and therefore may be much more viscous in themselves than could be tolerated if the solvents of the coating material were relied upon as the thinning medium.

The viscosity of the coating material that is dispersed also is one factor in determining the size and shape of the dispersed particles in the composition as it is applied. For example, globules of more viscous coating materials do not necessarily assume a spherical form when suspended but may by proper means be made to assume the shapes of filaments, elongated oval forms, tear drops and other irregular shapes. Also, with more viscous coating materials the dispersed particles have a greater tendency to retain their physical shape after being applied as a coating on a surface and to harden without substantial change in shape. This makes it possible to produce unusual textures, finishes and patterns. Also the thickness of the applied coating film in its hardened form can be varied by varying the type and viscosity of the coating material suspended in the aqueous medium. In general, more viscous coating materials of relatively high solids content give thicker coatings and less penetration on porous surfaces, all other factors being equal. Examples of such surfaces that can be coated satisfactorily in one coat with my dispersions include highly porous surfaces of composition boards, wallboards, soft unfinished wood, felt, fabrics, paper and even asphalt or tar impregnated surfaces.

Coating materials that are most adaptable to application in the form of my dispersions are those which are more viscous than the average conventional lacquer or enamel. In fact, relatively thin coating materials can be dispersed to better advantage if they are given a false body in some manner such as by the incorporation of water to produce a water-in-oil type of emulsion. Such false bodied coating materials are thus improved for producing my dispersions, although such false increase in viscosity does not produce a thicker coating when the dispersion of such coating material is applied to a surface.

Also, the texture of the applied and hardened coat is affected by the speed of drying of the coating material. A fast drying coating material generally produces a rougher texture than a slow drying coating material.

Dispersing medium

The preferred dispersing mediums are aqueous and may be made with ordinary tap water. Distilled water, of course, is satisfactory, although not required. In other words, the dispersions prepared according to my invention, unlike lacquer-in-water emulsions, are not appreciably affected by small amounts of electrolytes dissolved in the dispersing medium.

The aqueous dispersing medium acts as a thinner and, consequently, should not be too viscous if the dispersion is to be applied by spraying or brushing. If both phases are too viscous during the preparation of the dispersion, the product is apt to be more in the nature of an emulsion with the dispersed particles too small in size unless the speed and time of agitation are greatly reduced. Also, in such cases it may be necessary to use a higher proportion of the aqueous medium than is desired in order to form the dispersion as a dispersion of coating material in the aqueous medium and not as a dispersion of the aqueous medium in the coating material. In some instances, not all, it may be desirable to add to the water along with the stabilizing agent one or more other materials to adjust the pH of the dispersing medium, which has an effect on the size of the dispersed particles, or to decrease the interfacial tension of the aqueous dispersing medium, which also makes the dispersed particles smaller.

Various other materials may be dissolved or suspended in the aqueous medium such as dyes, wetting agents, pigments, water-proofing agents, freezing point depressants and the like. However, any such soluble additions should be made sparingly to avoid the production of dispersed particles too small in size, and so as not to destroy the effect of the stabilizing agent.

*Stabilizing agent*

A stabilizing agent should be added to the aqueous dispersing medium to enable the formation of dispersed particles of coating material and prevent them from coalescing with each other. Such stabilizing agents may be either organic or inorganic in nature and are preferably colloidal materials that are more or less soluble in the water, although I have found that under certain conditions very finely divided, relatively insoluble substances may also be used.

While I do not wish to be bound by any theory, it is my belief that the suspension stabilizer in my dispersions forms films around the dispersed particles which exist as thin layers and prevent coalescence of the dispersed particles. Many materials known as protective colloids, and other colloidal materials such as inorganic colloids may be used for this purpose, although stabilizing agents which are satisfactory for dispersing one coating material may not be particularly satisfactory for dispersing another coating material. Also, a stabilizing agent used in a relatively small proportion with one coating may have to be used in somewhat larger proportion to obtain a suitable dispersion of another coating material.

The selection of the particular stabilizing agent and the amount of such agent to use depends to a large extent upon the nature of the solvents incorporated in the coating material or materials to be dispersed. For example, with most nitrocellulose lacquers and other coating materials containing the same type of solvents, such as mixtures of the organic alcohols, ethers (or esters) and hydrocarbons, the following stabilizing materials have been found to work best in the proportions given, the percentage after each stabilizer being the strength by weight of the aqueous solution of the stabilizer.

| | Percent |
|---|---|
| Methyl cellulose (15 cps.) | 0.3 to 2 |
| Ethyl cellulose (low viscosity, water soluble) | 0.5 to 3 |
| Polyvinyl alcohol (med viscosity) | 0.3 to 2 |
| Casein (acid precipitated) | 0.5 to 2 |
| Gum tragacanth | 0.5 to 1 |
| Locust bean gum | 0.3 to 1 |
| Cellulose acetate phthalate | 0.3 to 3 |

On the other hand, for dispersing synthetic enamels and oil base paints, which ordinarily contain aromatic and aliphatic hydrocarbons as their solvents, the following stabilizing agents have been found to work best and preferably are employed in the percentages by weight indicated for each agent.

| | Percent |
|---|---|
| Polyvinyl alcohol (med. viscosity) | 0.5 to 5 |
| Quince seed extract | 0.3 to 1.5 |
| Ethyl cellulose (low viscosity, water soluble) | 1 to 5 |
| Cellulose acetate phthalate | 1 to 5 |
| Bentonite | 1 to 10 |
| Methyl cellulose (15 cps.) | 1 to 5 |
| Polystyrene ammonium maleate | 1 to 5 |

Other stabilizing agents which may be used with some coating materials include in addition to those previously mentioned, salts of methyl cellulose, such as a material sold commercially under the tradename CMC (carboxy methyl cellulose), hydroxy ethyl cellulose, poly methacrylic acid, gum arabic, gum cibara, gum karaya, gelatin, sodium alginate, albumins, pectin, starches, water soluble urea-formaldehyde, fuller's earth, talc, barium sulfate, calcium carbonate, calcium sulfate, magnesium carbonate and diatomaceous earth. All of these last mentioned salts are relatively insoluble in water and are not as satisfactory for most coating materials as the soluble materials, because larger amounts up to about 25% of these materials have to be used in the aqueous medium for good results. Also, the materials have to be in as finely divided form as possible.

Apart from the insoluble salts, it will be apparent that the foregoing stabilizing agents include not only cellulose derivatives but gums, proteins, carbohydrates and synthetic water soluble materials in the organic field, and colloidal materials in the inorganic field. In general, these agents should be employed in a concentration varying from $\frac{1}{10}$ of 1% to 10% in the aqueous medium, although in special cases such as with agents of lower viscosity larger amounts than 10% may be used. The best proportion, as will be apparent to those skilled in the in the art, will vary with different stabilizing agents and with different coating materials to be dispersed.

Other materials that I believe to be useful as stabilizing agents for preparing my dispersions are synthetic organic polymers of high molecular weight that are either soluble in water or reducible to a very fine powder of colloidal size.

The following simple tests can be used to determine quickly and readily whether a given material is a satisfactory stabilizer for use in accordance with my invention.

0.4 grams of the substance to be tested is dissolved in 40 cc. of distilled water and the solution poured into a 4 ounce glass jar or bottle. 20 cc. of a heavy bodied lacquer, or other type of coating material to be tested, is poured slowly into the solution in the jar and stirred with a spatula or similar instrument for about five minutes to break up the coating material into particles most of which are less than ⅛ inch in size. The jar or bottle is then stoppered or capped and allowed to stand for eight hours. If at the end of this time coalescence of the particles of coating material is not readily apparent to the naked eye, the substance tested is suitable as a stabilizer.

In carrying out the foregoing test, it should be kept in mind that while some substances are effective as stabilizers when only 0.5% or less of the substance by weight is dissolved in the water, other substances require a higher concentration in the water to be effective. Consequently, in this test, if a substance is only partially satisfactory, it may be desirable to repeat the test dissolving larger amounts of the substance in the 40 cc. of distilled water. It is also desirable to make sure that the substance is dissolved as well as possible in the water before the dispersion is formed, and for this purpose it may be necessary to raise the temperature of the water slightly in preparing the solution, or to add one or two drops of ammonium hydroxide or other reagent if such an addition is needed to form a solution.

Also, it should be noted that the foregoing test, if made with a relatively insoluble finely divided substance, should be carried out with larger amounts of the substance such as 5 to 10 grams of the substance in the 40 cc. of water and about a 10 minute period of stirring.

Method of preparing dispersions

The dispersions of my invention may be very easily prepared by using simple inexpensive equipment available in most any paint plant. For example, a simple tank or mixing kettle fitted with a suitable agitator such as a two-bladed rotary propeller type agitator is entirely adequate for preparing my compositions. Special equipment such as grinding mills, colloid mills, viscolizers, homogenizers and the like are not needed and, in fact, should be avoided in preparing the dispersions.

The aqueous medium is first prepared in the kettle by dissolving the proper amount of the selected stabilizing agent for the coating material to be dispersed. The solution formed may be prepared from tap water or distilled water, as desired. In the case of stabilizing agents such as casein and some of the other colloidal materials which dissolve only with some difficulty, it may be necessary to warm the contents of the kettle or to add water soluble materials that help to dissolve the stabilizer in order to obtain a satisfactory aqueous solution of stabilizing agent. After such a solution has been prepared, the coating material, such as a lacquer, paint, enamel, varnish, or the like, is poured slowly into the aqueous medium while the agitator is being operated at a sufficient speed to break up the coating material into the particles of desired size. The time and speed of agitation may be varied considerably, although ordinarily vigorous or violent agitation is not necessary or desirable since it tends to produce dispersed particles too small in size.

In preparing multiple dispersions such as dispersions of two or more differently colored coating materials in a single aqueous medium, the different coating materials can be dispersed separately in their own aqueous medum by the above procedure, and then the two dispersions may be poured into the same tank or kettle and intermixed by a shorter period of agitation of the same type used in their original preparation. Mixtures may also be prepared of three or more dispersions of coating materials by the same procedure.

It is also possible to prepare such multiple dispersions in a single kettle or tank by first dispersing one coating material thoroughly, and then gradually adding the second coating material with continued agitation until it is fully dispersed. This procedure may be continued by successive additions of any number of coating materials, provided they are not added simultaneously to the aqueous medium and a sufficient quantity of the aqueous medium is used to insure dispersion of all the coating materials in the aqueous medium.

For most purposes, I prefer to mix multiple dispersions by forming separate dispersions of the different coating materials and then combining these dispersions by intermixing them. With this method it is possible to obtain better control of the size of dispersed particles of each coating material because if different coating materials are added successively to a single medium, continued agitation while the last coating material is being added usually continues to reduce the particle sizes of the dispersed particles previously added.

A very important feature of my invention is that the sizes and shapes of the particles of the coating material can be controlled. In the first place, the nature of the stabilizer selected, the amount of the stabilizer used, i. e. the concentration of stabilizer in the aqueous dispersing medium, the viscosity of the coating material employed, and the presence of substances such as wetting agents that reduce the interfacial tension of the aqueous medium, and soluble solvents present in the coating materials all have an effect upon the size and shape of the particles of dispersed coating material. For example, all other conditions being equal, a higher speed of agitation will produce smaller particles of dispersed coating material in the final composition. Also, an increase in the concentration of stabilizer dissolved in the aqueous medium usually has the effect of reducing the size of the dispersed particles. The presence of wetting agents or the like, either added to the aqueous solution or dissolved in it from the particles of dispersed coating material, likewise reduce the size of the dispersed particles.

The shape of the particles is affected principally by the viscosity of the coating material dispersed and the type and amount of stabilizing agent used in the dispersing medium.

For example, the affect of these various control factors is well illustrated by the following table showing the results obtained by varying the kind and amount of stabilizer and the speed of agitation. All of these tests were made with multicolor dispersion of white and red lacquers of the compositions given in Examples I and II which had a viscosity of 20 minutes measured on a #3 Zahn viscosity cup, except that the viscosity of the lacquers used in test number 6 were reduced to 5 minutes by addition of methyl iso butyl ketone. In each case, the dispersions of the separate lacquers were prepared by the general procedure of Example I and equal parts of the dispersions were mixed together. The particle sizes given are the dominant or most frequent sizes appearing in the hardened coating after the dispersion was applied to a surface.

ANALYSES OF METHOD FOR CONTROLLING PARTICLE SIZES AND SHAPES

| No. | Stabilizer Used | | Speed of Agitation | Particles obtained | |
|---|---|---|---|---|---|
| | Per cent by weight | Kind | | Sizes | Shapes |
| | | | R. P. M. | | |
| 1 | 0.5 | Methyl cellulose | 175 | 1500–2000 | Filaments. |
| 2 | 0.5 | ...do... | 350 | 1000–1500 | Do. |
| 3 | 0.5 | ...do... | 600 | 500–1000 | Do. |
| 4 | 0.5 | ...do... | 700 | 250– 500 | Do. |
| 5 | 1.0 | ...do... | 700 | 100– 250 | Do. |
| 6 | 0.5 | ...do... | 600 | 250– 500 | Globular. |
| 7 | 0.5 | Polyvinyl alcohol | 600 | 100– 250 | Spherical. |
| 8 | 1.0 | ...do... | 600 | 25– 100 | Do. |
| 9 | 5.0 | Gum cibara | 600 | 2000–2500 | Do. |
| 10 | 10. | ...do... | 600 | 1000–2000 | Do. |

Various other factors may also influence the particle size and shape, such as the pH of the aqueous medium. For example, an aqueous solution of polyvinyl alcohol will produce dispersed particles of larger size if made slightly acid than it will if it is slightly alkaline.

The proportion of aqueous medium to coating materials is also important. While this proportion may be varied considerably with different stabilizing agents and coating materials, in general, I find that it is desirable to use by weight at least one part of aqueous dispersing medium to about 4 parts of coating material. If too small a proportion of the aqueous medium is employed, of course, the aqueous phase is apt to become the dispersed phase instead of the continuous phase, and it is essential with my dispersions as applied to a surface that the aqueous solution constitute the dispersing or continuous phase. On the other hand, there is no critical upper limit on the amount of the aqueous phase since even large proportions of the aqueous solution do not alter the fundamental character of the dispersion but simply affect the nature of the coating films obtained. Larger proportions of water give dispersions with larger particles of dispersed coating materials, and produce more porous or scattered coatings.

An important feature of my invention is that the aqueous phase acts as a thinner for the dispersed coating materials. Consequently, my dispersions can be prepared with only sufficient aqueous medium to act as the continuous phase and then adjusted to proper consistency and viscosity before application simply by adding tap water and stirring.

For the production of coating films that are not intended to be open or porous, I prefer to employ in the dispersions as applied from about 1 to 3 parts of the coating material to 1 part of the aqueous dispersing medium. For most purposes about 2 parts of coating material to 1 part of the aqueous medium is very satisfactory.

In order that my invention may be more clearly understood, the following examples of dispersions of coating materials prepared according to my invention are mentioned as typical although it is to be understood that the invention is not limited thereto. All parts or proportions are by weight unless otherwise stated.

*Example I.—White nitrocellulose lacquer*

50 parts by weight of a 1% solution of methyl cellulose (15 cps.) was placed in a mixing kettle provided with a two bladed propeller agitator driven by an electric motor. The agitator was started and while rotating at about 600 R. P. M., 100 parts of a lacquer having the following composition was poured slowly into the kettle.

| | Parts by weight |
|---|---|
| Titanium dioxide | 12 |
| Wet nitrocellulose (5-6 sec.) | 15 |
| Ester gum | 10 |
| Castor oil | 2 |
| Dibutyl phthalate | 2 |
| Butyl alcohol | 4 |
| Butyl acetate | 8 |
| Methyl amyl acetate | 13 |
| Toluol | 17 |
| Xylol | 17 |
| Total | 100 |

Agitation was continued for about 5 minutes after addition of the lacquer was completed. The dispersion was then ready for application as a coating composition. Such a composition can be applied with excellent results even to a surface of paper, wall board, plaster board, wood, etc., by spraying it on the surface with an ordinary lacquer spray gun using an air pressure of say 50 lbs.

*Example II.—Red nitrocellulose lacquer*

A dispersion was prepared in the same manner as described in Example I except that the lacquer contained 12 parts of Indian Red Oxide instead of the 12 parts of titanium dioxide.

*Example III.—Multi-color lacquer dispersion*

Separate dispersions of white and red lacquers were prepared as described in Examples I and II. One of these dispersions was then placed in the kettle with the agitator running at 500 R. P. M. and the other dispersion was poured in and mixed with it. After about 5 minutes of mixing, the agitator was stopped and the mixed or multiple dispersion was sprayed onto a piece of cardboard using a standard lacquer spray gun under 50 lbs. air pressure. The white and red particles were easily seen by the naked eye after the coating film had hardened in place, and it was found that the coating materials did not penetrate appreciably or strike through even on the porous surface of the cardboard.

*Example IV.—Yellow synthetic enamel*

92 parts of a tap water solution containing 0.55 parts of quince seed extract was placed in the mixing kettle and 100 parts of a yellow enamel was slowly added while the agitator was operating at a speed of 400 R. P. M. The enamel had the following composition:

| | Parts by weight |
|---|---|
| Chrome yellow pigment | 28 |
| 50% urea-formaldehyde resin in butyl alcohol (sold as Beetle 2278) | 14 |
| 50% soy bean alkyd resin in xylol (sold as Rezyl 387-5) | 58 |
| Total | 100 |

The agitator was stopped about 5 minutes after the last of enamel was added, and the dispersion was then ready for direct application as a coating composition.

*Example V.—Green synthetic enamel*

A dispersion was prepared as described in Example IV except that a green enamel of the following composition was substituted for the yellow enamel:

| | Parts by weight |
|---|---|
| Chrome green pigment | 20 |
| 50% urea-formaldehyde resin in butyl alcohol (sold as Bettle 2278) | 16 |
| 50% soy bean alkyd resin in xylol (sold as Rezyl 387-5) | 64 |
| Total | 100 |

*Example VI.—Multi-color enamel dispersion*

Equal parts of dispersions prepared according to Examples IV and V were mixed together and stirred for 5 minutes with the agitator rotating at about 400 R. P. M. The mixture was then sprayed with an ordinary spray gun on both kraft and asphalt paper surfaces. The coating formed in hardened layers of excellent hiding power and high gloss on both surfaces without penetrating through the kraft paper and with no discernible bleeding on the asphalt paper. These same enamels, before dispersion in the aqueous medium and after reduction to a sprayable viscosity, when sprayed on the papers, soaked through the kraft paper and formed only discontinuous films of substantially no gloss.

*Example VII.—Oil base paints*

A dispersion was formed by the procedure of Example IV using 50 parts by weight of a tap water solution containing 1% of high viscosity polyvinyl alcohol and 2.5% of bentonite. 100 parts by weight of an oil paint of the following composition was dispersed in this aqueous medium.

| | Parts by weight |
|---|---|
| Indian red oxide | 15 |
| Linseed oil | 4 |
| Oxidized sardine oil (Saybolt viscosity of 100 at 210° F.) | 70 |
| Mineral spirits | 10 |
| 6% Cobalt dried solution | 0.5 |
| 24% Lead drier solution | 0.5 |
| Total | 100 |

The dispersion thus obtained when applied with an ordinary spray gun produced a coating of very high gloss.

*Example VIII*

A dispersion was prepared as in Example VII except that the oil base paint contained chrome yellow pigment instead of the Indian red oxide.

*Example IX.—Multi-color oil paint*

A mixture of equal parts of the oil paint dispersions prepared according to Examples VII and VIII was simply stirred together to form a multiple dispersion of the two coating materials. This mixture likewise was readily sprayable and after application the red and yellow colored particles of paint retained their separate color without appreciable blending.

*Example X.—Polystyrene dispersion*

1 part of cellulose acetate phthalate was dissolved in 49 parts of tap water adjusted to a pH of about 8.8 by addition of ammonium hydroxide. This solution was then placed in the mixing kettle and the rotary agitator started and rotated at 750 R. P. M. 100 parts of coating material of the following composition was then added and agitation was continued for 5 minutes after this addition was completed:

| | Parts by weight |
|---|---|
| Titanium dioxide (white) | 25 |
| Polystyrene resin (mol. wt. about 50,000) | 25 |
| Xylol | 50 |
| Total | 100 |

In this dispersion, most of the dispersed particles of coating material were somewhat smaller in size than the dispersed particles in the foregoing examples, but the dispersion sprayed well without cobwebbing and produced a good non-bleeding low gloss coating film over an asphalt surface.

*Example XI.—Ethyl cellulose lacquer*

An aqueous casein solution was formed by dissolving 0.75 part of casein in 49 parts tap water containing 0.25 part of 26° Bé ammonium hydroxide. This solution was placed in the kettle, the agitator started and 100 parts of orange lacquer of the following composition added.

| | Parts by weight |
|---|---|
| Chrome orange pigment | 11 |
| Ethyl cellulose (cps.) | 15 |
| Ester gum | 15 |
| Castor oil | 4 |
| Dibutyl phthalate | 5 |
| Butyl alcohol | 8 |
| Xylol | 12 |
| Toluol | 30 |
| Total | 100 |

*Example XII.—Vinyl acetate lacquer*

A 2% solution in tap water of soluble ethyl cellulose sold under the name of Ethulose was prepared and 50 parts by weight of the solution placed in the mixing kettle. To this was added with mild agitation 100 parts by weight of a lacquer of the following composition:

| | Parts by weight |
|---|---|
| Titanium dioxide | 12 |
| Vinyl acetate polymer | 31 |
| Toluol | 43 |
| Methyl amyl acetate | 14 |
| Total | 100 |

The coarse dispersion thus obtained was suitable for application as a coating composition to various surfaces.

*Example XIII.—Water-in-lacquer enamel*

It is even possible according to my invention to form a dispersion in an aqueous medium of an emulsion of water in lacquer or enamel. Such an emulsion is more viscous or heavier bodied due to the incorporation of the water. Thus, when such an emulsion is dispersed in water and applied as a coating composition, the final hardened coating film can be made thinner. This procedure also makes thinner or low bodied coating materials available for application as coatings in accordance with my invention.

In this case the coating material is first thickened or made more viscous by incorporation of a small quantity of water containing an emulsifying agent to produce an emulsion. In extreme cases such as the following example, a fairly large amount of water may be dispersed or emulsified to increase the viscosity of the coating before it is dispersed in the aqueous medium.

Such a water-in-oil type emulsion or fine dispersion was made by mixing together equal parts of a 1% solution of locust bean gum in tap water with a relatively thin enamel of the following composition:

| | Parts by weight |
|---|---|
| Chrome green pigment | 18 |
| 50% urea-formaldehyde resin in butyl alcohol | 14 |
| 50% soy bean alkyd resin in xylol | 56 |
| Butyl alcohol | 12 |
| Total | 100 |

The locust bean gum solution was very viscous and the enamel solvents were immiscible with water so that upon active mixing, a water-in-oil type of emulsion or fine dispersion was readily formed.

50 parts of this emulsion was then poured slowly with agitation into 50 parts of a 2% aqueous solution of a water soluble ethyl cellulose as a stabilizing agent. A dispersion of the emulsion in relatively large particles in the water phase was thus formed without breaking down the emulsion. This dispersion was sprayed on both porous and non-porous surfaces, producing a thin smooth coating film when hardened.

*Example XIV.—Multi-color dispersion of emulsions*

A dispersion of an emulsion of a white enamel was prepared by the procedure of Example XIII except that the pigment in the enamel was titanium dioxide instead of chrome green.

Equal parts of these dispersions of green and white enamel emulsions were stirred together and sprayed onto kraft paper. The coating did not strike through the paper and after hardening was in the form of a thin smooth coating in which the separate colors were visible to the eye.

The application of coating materials in the form of dispersions in an aqueous medium in accordance with my invention opens the door to many uses of such coating materials previously considered either impractical or impossible. Multiple dispersions of two or more such coating materials, particularly coating materials of different colors or shades, not only give coatings of decidedly unique appearance and capable of almost endless variation in respect to combinations of colors, textures, particle size and shape, and thickness, but also provides better covering power on rough, unprepared and porous surfaces and simplifies color matching.

I have successfully applied such dispersions to a rough planed pine board containing a dark knot and obtained complete concealment of the knot by a single coat without any previous sanding or sealing of the surface. Composition and pressed boards containing similar dark and light spots are similarly covered completely by a single coat of a multi-color dispersion.

Because of the low penetration of my coating compositions on even porous surfaces, such multi-color dispersions are well adapted for application to dissimilar surfaces to conceal the dissimilarities. For example, a single coat of a multi-color dispersion applied to surfaces of a box with a wooden bottom and cardboard sides produces a coating of uniform appearance on both surfaces.

Color matching is also much easier with my multi-color dispersions than it is with ordinary coatings. As a rule shop formulas are only approximate guides to matching the color of one batch of enamel or paint to the color of a preceding batch. With my multi-color dispersions this problem is made comparatively easy because a slight difference in tone or tinting strength of pigments in a coating material used in a multi-color dispersion is not seen as readily in the hardened coating film as it is when a conventional single color coating material is applied.

My invention can also be used to produce mixed coatings of two or more coating materials that otherwise would not be compatible. For example, a dispersion of the nitrocellulose lacquer prepared according to Example I can be mixed with the synethic enamel dispersion prepared according to Example V and the single composition thus obtained sprayed onto a surface to form a truly heterogeneous coating film. Apparently, the particles of each coating material are so encased or protected by layers or films of the stabilizing agents that they remain separate from each other and do not react or blend together.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A stable coating composition which comprises a dispersion of discrete particles of coating materials in an aqueous dispersing medium containing a suspension stabilizer, most of said particles being larger than 50 microns in size and certain of said particles being of different color than others of said particles.

2. A liquid composition for direct application as a surface coating which comprises a dispersion of particles of viscous coating material in a water solution containing a colloidal suspension stabilizer in an amount sufficient to prevent appreciable coalescence but insufficient to cause emulsification of said particles, most of said particles exceeding 50 microns in size.

3. A liquid composition for direct application to a surface as a protective or decorative coating which comprises discrete particles of coating material suspended in an aqueous medium containing a stabilizing agent, a majority of said particles being larger than 50 microns in size and the coating material of each particle including a bodying substance, coloring matter and at least one organic solvent, said suspended discrete particles being stable in size and remaining in suspension without appreciable coalescence or blending upon shaking or stirring after standing for a substantial length of time.

4. A liquid composition for direct application to a surface as a protective or decorative coating by spraying, brushing and the like which comprises discrete particles of a heavy bodied lacquer dispersed in an aqueous solution of a stabilizing colloid that serves as a thinner for said composition, a majority of said particles exceeding 50 microns in size.

5. A liquid composition for direct application to a surface as a protective or decorative coating by spraying, brushing and the like which comprises discrete particles of a heavy bodied enamel dispersed in an aqueous solution of a stabilizing colloid that serves as a thinner for said composition, a majority of said particles exceeding 50 microns in size.

6. A liquid composition for direct application to a surface as a protective or decorative coating by spraying, brushing and the like which comprises discrete particles of a heavy bodied oil paint dispersed in an aqueous solution of a stabilizing colloid that serves as a thinner for said composition, a majority of said particles exceeding 50 microns in size.

7. A coating composition which comprises a dispersion of relatively large particles of viscous coating materials in an aqueous solution of a suspension stabilizer, different particles being differently colored and the amount and composition of the stabilizer being selected to maintain a majority of said particles discrete and larger than 50 microns in size after said composition is applied to a surface.

8. A coating composition capable of direct application to form a multi-colored coating film in one operation which comprises a dispersion of differently colored viscous lacquers readily visible as differently colored discrete particles in a dilute aqueous solution of a colloidal stabilizing agent.

9. A coating composition capable of direct application to form a multi-colored coating film in one operation which comprises a dispersion of differently colored viscous enamels readily visible as differently colored discrete particles in a dilute aqueous solution of a colloidal stabilizing agent.

10. A coating composition capable of direct application to form a multi-colored coating film in one operation which comprises a dispersion of differently colored viscous oil paints readily visible as differently colored discrete particles in a dilute aqueous solution of a colloidal stabilizing agent.

11. A coating composition which comprises a dispersion of particles of a coating material in an aqueous dispersing medium containing a stabilizing agent, said particles of coating material comprising a water-in-oil type of emulsion.

12. A method of preparing a coating composition which comprises adding to an aqueous dispersing medium containing a stabilizing agent a coating material that is relatively immiscible with said solution, agitating the mixture to form a dispersion of relatively large particles of said coating material in said aqueous solution, and arresting said agitation before emulsion size particles are formed, the amount of said stabilizing agent being sufficient to prevent appreciable coalescence of the particles but insufficient to cause emulsification.

13. A method of preparing a coating composition which comprises adding to an aqueous dispersing medium containing a stabilizing agent a coating material that is relatively immiscible with said solution, agitating the mixture to form a dispersion of said coating material, adding to said dispersion a second relatively immiscible coating material of different color, and agitating the mixture to form a multiple dispersion of said coating materials in said aqueous medium, the amount of said stabilizing agent being sufficient to prevent appreciable coalescence of the particles but insufficient to cause emulsification.

14. A method of preparing a coating composition which comprises forming separate dispersions of relatively large particles of differently colored coating materials in aqueous dispersing mediums containing a stabilizing agent, and mixing said separate dispersions with mild agitation.

15. A method of preparing a coating composition which comprises forming an aqueous solution of a synthetic organic colloidal stabilizing agent, and dispersing a viscous coating material in said solution in the form of particles most of which exceed about 50 microns in size.

16. A method of preparing a coating composition which comprises mixing together with mild agitation separate dispersions of differently colored viscous coating materials in aqueous mediums, said aqueous mediums comprising dilute water solutions of colloidal stabilizing agents, and the coating materials in said dispersions being in the form of discrete particles most of which exceed 50 microns in size.

17. In a method of preparing a coating composition by forming an aqueous dispersing medium containing a stabilizing agent and dispersing discrete particles of viscous coating material in such medium by agitation, the step of controlling the size of the dispersed particles so that a majority thereof are larger than 50 microns by adjusting the speed of agitation in accordance with the kind and amount of stabilizing agent in the dispersing medium.

18. In a method of preparing a coating composition by forming an aqueous dispersing medium containing a stabilizing agent and dispersing discrete particles of viscous coating material in such medium by agitation, the steps of controlling the nature of coating film obtained with said composition by using a speed of agitation low enough to form relatively large dispersed particles, and adjusting the proportion of aqueous medium to coating medium to control the porosity of said coating film.

19. A liquid composition for coating which comprises a dilute aqueous colloidal solution of an organic stabilizer, and discrete particles of colored coating material dispersed throughout said aqueous solution, most of said particles being larger than 50 microns in size and held in suspension without dissolving in the aqueous solution or coalescing noticeably with each other when the composition is stirred or allowed to stand.

20. A liquid coating composition which comprises a dilute aqueous solution of an organic stabilizing colloid, and separate and distinct particles of coating material suspended therein, said particles being differently colored and each containing an organic solvent and film forming constituent, said particles of different color being readily distinguishable from each other and remaining as separate discrete particles without noticeable blending when the composition is stirred and also when it is allowed to stand.

21. A stable liquid composition for direct application to a surface as a protective or decorative coating which consists of globules of water insoluble colored coating materials, most of which globules are 50 microns or larger in size, surrounded by a water solution of a stabilizing colloid in an amount sufficient to prevent appreciable coalescence of said globules but insufficient to cause emulsification.

22. A composition as defined in claim 2 in which the colloidal suspension stabilizer is a synthetic organic cellulose compound.

23. A composition as defined in claim 3 in which the stabilizing agent in the aqueous medium is an organic colloid derived from vegetable material.

24. A composition as defined in claim 21 in which the stabilizing colloid is a synthetic organic colloid that forms a viscous solution in water.

25. A composition as defined in claim 21 in which the globules of coating materials comprise a binder, coloring matter and solvent, and in which a substantial proportion of the globules are of different composition from other globules in the composition.

JOHN C. ZOLA.

REFERENCES CITED

The following references are of record in the file of this patent:

UNITED STATES PATENTS

| Number | Name | Date |
| --- | --- | --- |
| 2,035,520 | Baird | Mar. 31, 1936 |

(References on following page)

UNITED STATES PATENTS

| Number | Name | Date |
|---|---|---|
| 2,044,571 | Hollabaugh | June 16, 1936 |
| 2,044,572 | Hollabaugh | June 16, 1936 |
| 2,123,152 | Rivat | July 5, 1938 |
| 2,190,705 | Dreyling | Feb. 20, 1940 |
| 2,216,233 | Dreyling | Oct. 1, 1940 |
| 2,332,939 | Schmitz | Oct. 26, 1943 |
| 2,336,484 | Klikenstein | Dec. 14, 1943 |
| 2,342,581 | Hoffmann | Feb. 22, 1944 |
| 2,357,927 | Berg | Sept. 12, 1944 |
| 2,382,533 | Auer | Aug. 14, 1945 |
| 2,427,481 | Wieble | Sept. 16, 1947 |

FOREIGN PATENTS

| Number | Country | Date |
|---|---|---|
| 351,444 | Great Britain | June 19, 1931 |
| 477,997 | Great Britain | Jan. 10, 1938 |
| 528,069 | Great Britain | Oct. 22, 1940 |
| 116,315 | Australia | Dec. 17, 1942 |